United States Patent [19]
Montgomery et al.

[11] Patent Number: 5,169,233
[45] Date of Patent: Dec. 8, 1992

[54] METHODS OF MEASURING TEMPERATURE AND APPARATUS FOR USE THEREWITH

[75] Inventors: Robert W. Montgomery, Laughton-en-le-Morthen; Kenneth H. Mackenzie, Town Gate, both of England

[73] Assignee: British Steel PLC, London, England

[21] Appl. No.: 775,330

[22] Filed: Oct. 11, 1991

[30] Foreign Application Priority Data

Oct. 17, 1990 [GB] United Kingdom ............... 9022496

[51] Int. Cl.$^5$ .......................... G01J 5/02; G01K 1/14
[52] U.S. Cl. ..................................... 374/124; 358/113; 374/139
[58] Field of Search ............... 374/124, 139; 358/110, 358/113; 356/51

[56] References Cited

U.S. PATENT DOCUMENTS

| | | | |
|---|---|---|---|
| 4,539,588 | 9/1985 | Ariessohn et al. | 358/113 |
| 4,619,533 | 10/1986 | Lucas et al. | 374/139 X |
| 4,647,220 | 3/1987 | Adams et al. | 374/124 X |
| 4,737,844 | 4/1988 | Kohola et al. | 358/100 |
| 4,737,917 | 4/1988 | Perron | 374/134 X |

FOREIGN PATENT DOCUMENTS

| | | | |
|---|---|---|---|
| 91529 | 5/1986 | Japan | 374/139 |
| 54319 | 3/1989 | Japan | 374/139 |
| 174921 | 7/1989 | Japan | 374/124 |
| 210830 | 8/1989 | Japan | 374/124 |
| 2227083A | 7/1990 | United Kingdom . | |

OTHER PUBLICATIONS

Kelly, Kenneth J., "Lines of Constant Correlated Color Temperature Based on MacAdam's (u,v) Uniform Chromaticity Transformation of the CIE Diagram", *Journal of the Optical Society of America*, vol. 53, No. 8 (Aug. 1963).

*Primary Examiner*—Daniel M. Yasich
*Attorney, Agent, or Firm*—Kinney & Lange

[57] ABSTRACT

For the measurement of the temperature of a body (e.g. a melt) whose temperature is such that radiation is emitted from the body surface, a camera sighted on the body surface produces a real image from a selected area of which electronic signals are derived representative of the magnitude of a plurality (preferably three) of color components of radiation. These derived signals are subsequently processed to provide a measure of body temperature.

5 Claims, 2 Drawing Sheets

METHODS OF MEASURING TEMPERATURE AND APPARATUS FOR USE THEREWITH

BACKGROUND OF THE INVENTION

This invention relates to methods of measuring temperature and apparatus for use therewith. More especially, the invention relates to a method of and apparatus for measuring the temperature of a liquid, gas or solid body from which electromagnetic radiation in the near infra-red, visible, and ultraviolet regions is emitted. Examples of such liquids include a melt of, for example, molten steel held in a ladle furnace; molten iron or steel being teemed from, for example, a ladle or tundish; and molten glass or aluminium retained in a heating vessel. Examples of solids include steel slabs, sheets or ingots; and continuously cast metal strands. The temperature of flowable material such as incadescent powders, for example lime, can also be measured.

For the sake of convenience—but not by way of limitation—the invention will be introduced and described with reference to ladle steelmaking.

A ladle steelmaking process includes the steps of heating and adjusting the composition of molten steel in a ladle, the steel having been produced in for example, an electric arc furnace or a basic oxygen vessel. The ladle of molten steel is covered and placed in a heating station where the steel is heated to a predetermined temperature by, for example, arcs sustained by one or more graphite electrodes. A layer of slag is applied to the steel surface to refine the steel and to enhance the efficiency of energy transfer from the arcs to the steel melt.

The steel in the ladle is stirred by, for example, bubbling an inert gas through it or by magnetic induction, to maintain homogeneity of temperature and composition. The stirring mechanism gives an upward thrust to a localised column of steel in the ladle which, depending upon the stirring power, raises an area of the steel surface above the slag cover. The area of exposed steel is commonly referred to as the steel "eye" in the slag layer.

DESCRIPTION OF THE PRIOR ART

Conventionally, the temperature of the steel during ladle steelmaking is measured two or three times during treatment by dipping a disposable thermocouple into the melt. This process requires the heating process to be interrupted for a short period of time and servicing of the thermocouple dipping mechanism by the installation of new thermocouple tips.

SUMMARY OF THE INVENTION

It is an object of this invention to provide an improved method of and apparatus for accurately measuring temperature which avoids or at least alleviates the disadvantages referred to above, and which has broad application not only to the process described but generally to the measurement of the temperature of a body of a liquid, gas or solid heated to a temperature at which detectable radiation is emitted from a surface of the body.

In one aspect, the present invention provides a method of measuring the temperature of a body in which a plurality of different colour components of radiation emitted from the body are identified by a camera sighted to produce a real image of the body or a part thereof, deriving from a selected area of the image or images produced a multiplicity of signals representative of the magnitude of the colour components and processing the signals to provide a measurement of the temperature of the body.

The body may be liquid, e.g. a melt, a solid, e.g. a cast slab, gas or flowable particulate material.

Preferably, three colour components of radiation emitted from the body are identified by the camera, a multiplicity of signals representative of all three colour components being processed to provide a measurement of body temperature.

The colours may be, or may be selected from red, green and blue (or the complementary colours thereto); however, other colour components may be identified which may be within or outside the visible waveband, e.g. in the infra-red or ultra-violet spectra.

In another aspect, the invention provides apparatus for measuring the temperature of a body, the apparatus comprising a camera sighted on the body for identifying a plurality of different colour components of radiation emitted from a selected surface of the body, means for deriving from a selected area of the real image produced by the camera a multiplicity of signals representative of the magnitude of these components at a plurality of sites within the image and means for processing the signals to provide a measurement of the temperature of the body.

The camera may be a still camera adapted to produce a focused or defocused image, a video camera or a television camera e.g. a charge coupled device camera. The camera position may be fixed; alternatively, means may be provided to enable the camera to scan the surface of the body.

In one embodiment of the invention, the body comprises a melt. In this embodiment the selected surface area may be the "eye" of the exposed melt, e.g. steel, determined from an analysis of the real image depicted on the camera "screen" which in turn may comprise a two dimensional matrix of radiation sensors masked by wavelength sensitive filters to provide signals proportional to the three colour components mentioned.

In this embodiment, the camera may be positioned within the structure of a closure lid of a furnace. Alternatively, the camera may be positioned remote from the furnace, the camera aperture being optically coupled (for example by optical fibres or by a series of mirrors or lenses) to the furnace interior. In a further arrangement the camera may be positioned behind a window set in a wall of the furnace.

The temperature measurement may be effected from an analysis of the relative magnitudes of selected colour components after having taken account of factors affecting emissivity.

The camera may conveniently be sited as depicted in our published United Kingdom Patent Application No. 2227083.

By directing the camera at the eye of the melt a truly representative reading for the temperature prevailing in the bulk of the melt is obtained since the eye is being continually refreshed by movement of the molten mass. Moreover, whilst two colour pyrometry—measurement of the ratio between red and green light spectra—is known, in this invention the further information from a third component, e.g. the blue spectrum, is preferably available to give a more reliable measurement. Further, whereas the size and position of the eye is known to change within the period of treatment within a ladle furnace and from one treatment to another, with this system the position of the eye is accurately identified and radiation is analysed from that source alone.

Additionally, the radiation intensity received from elemental areas of the turbulent surface of the eye will vary, according to the angle of the surface element presented to the camera. However, in this invention the camera employed can sample radiation over a period as short as 0.001 seconds so that the surface profile does not change significantly over the period of measurement. The image, corresponding to these elements, can be analysed to determine the elemental temperatures, and the calculated temperatures from all the elements can then be statistically analysed to determine an accurate temperature representative of the steel bulk. Increasing the multiplicity of elemental measurements within each "frame" can be utilised to increase the precision of the measurement of mean temperature, as can the use of data from successive "frames".

The method and apparatus described can be used whenever the field of view between the camera aperture and the slag/steel surface is not obstructed by fumes given off by the process, and whenever hot gases or reflected radiation from the arc do not coincide with the position of the eye.

These conditions vary throughout a steel treatment cycle according to whether additions are being made to the molten steel and whether the arcs are exposed above the slag. Hence, the suitability of the conditions for temperature measurement may be continuously assessed by analysis of the camera images using, e.g. image enhancement techniques. Where it is appropriate to extinguish the arcs to achieve the correct conditions, a signal will be sent to an electrode regulator automatically to raise the electrodes for the brief period of the temperature measurement.

As mentioned previously, the method and apparatus of the invention can also be employed to measure the temperature of a solid body, such as a steel slab or sheet leaving a rolling mill or a cast ingot. Thus, a plurality of different colour components of radiation produced from real images of one or several cameras sighted above the path to be followed by a slab leaving a rolling mill are derived to provide a multiplicity of signals which are subsequently processed to provide a measure of the body temperature. For a continuously cast strand of, for example, steel, the temperature of the strand at various locations along the strand may be detected in accordance with the invention.

In a further aspect, there is provided a method of measuring the temperature of a body whose temperature is such that radiation is emitted from a surface of the body, the method comprising the steps of producing by means of a camera sighted into the body surface a real image, deriving from a selected area of the image electronic signals representative of the magnitude of a plurality of colour components of radiation at a multiplicity of selected sites on the body surface and processing these signals to provide a measure of the temperature of the body.

BRIEF DESCRIPTION OF THE DRAWINGS

In order that the invention may be fully understood one embodiment thereof will now be described, by way of example only, with reference to the accompanying diagrammatic drawings, in which.

DETAILS AND DESCRIPTION OF PREFERRED EMBODIMENTS

Figure 1:
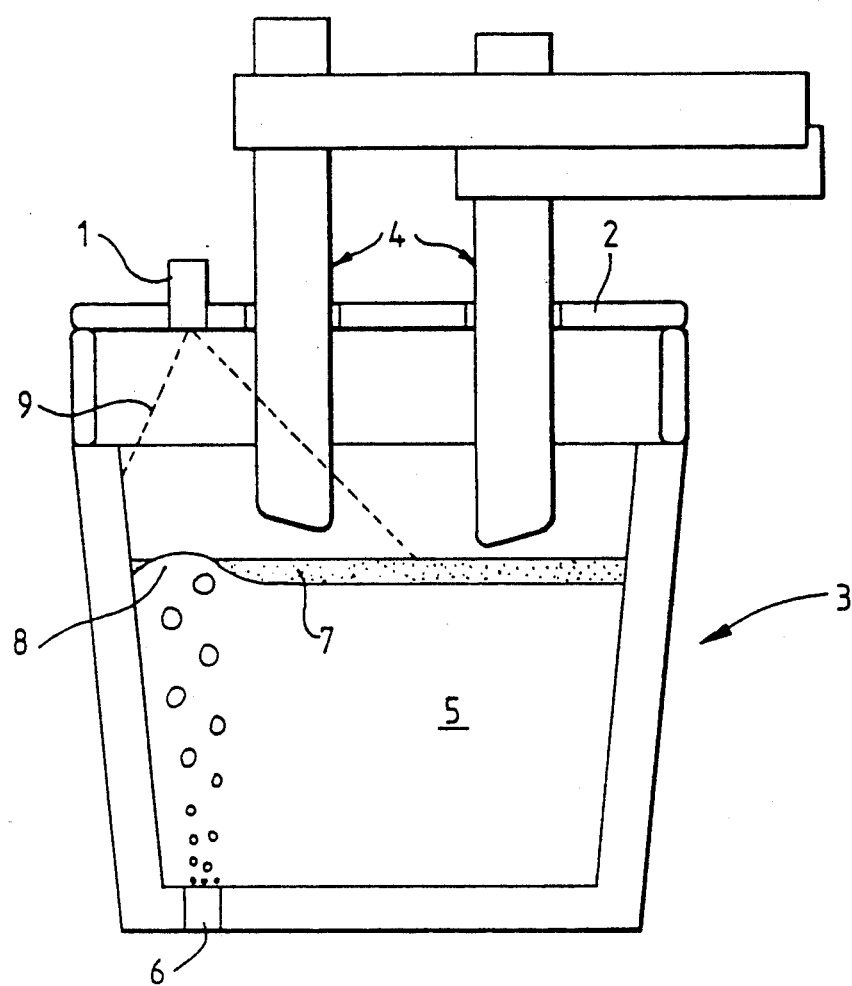
FIG. 1 illustrates the installation of a television camera in a ladle furnace, and the steel "eye" in the slag layer caused by bubbling gas through a porous plug in the bottom of the ladle.

Referring to FIG. 1, a charge coupled device (CCD) television camera 1 is mounted in an enclosure set in the roof 2 of a ladle furnace 3 into which electrodes 4 depend. The camera may be positioned elsewhere on or close to the furnace. Thus, the camera may be sighted through a toughened window set in one wall of the furnace above or below the level of the steel. In the embodiment illustrated an image of the ladle interior is projected onto a light sensitive surface of the camera 1 via a gas-purged pin-hole, as described in our United Kingdom Patent application No. 2227083.

Molten steel 5 present in the ladle 3 is stirred by injecting gas through a porous plug 6 set in the hearth of the ladle. The surface of the steel is raised above a layer of slag 7 on the steel surface by the upthrust of the rising gas bubbles. The exposed steel surface is known as the "eye" 8 and since this steel surface is being continuously refreshed by upward movement of the steel bulk, its temperature is closely representative of the temperature of the steel bulk.

The image projected on to the television camera 1 contains an area corresponding to the "eye" 8 in the slag and techniques are used to identify this area as will be described below. The field of view of the camera is shown in broken line and bears the reference numeral 9.

The surface of the television camera on to which the image is projected comprises a matrix of radiation sensitive elements which respond individually to wavebands of red, green or blue radiation and the electronic circuits inside the camera separate the outputs of the different colour sensors to provide three analogue electronic representations of the image corresponding to the red, green and blue radiation from the camera's field of view 9.

Figure 2:
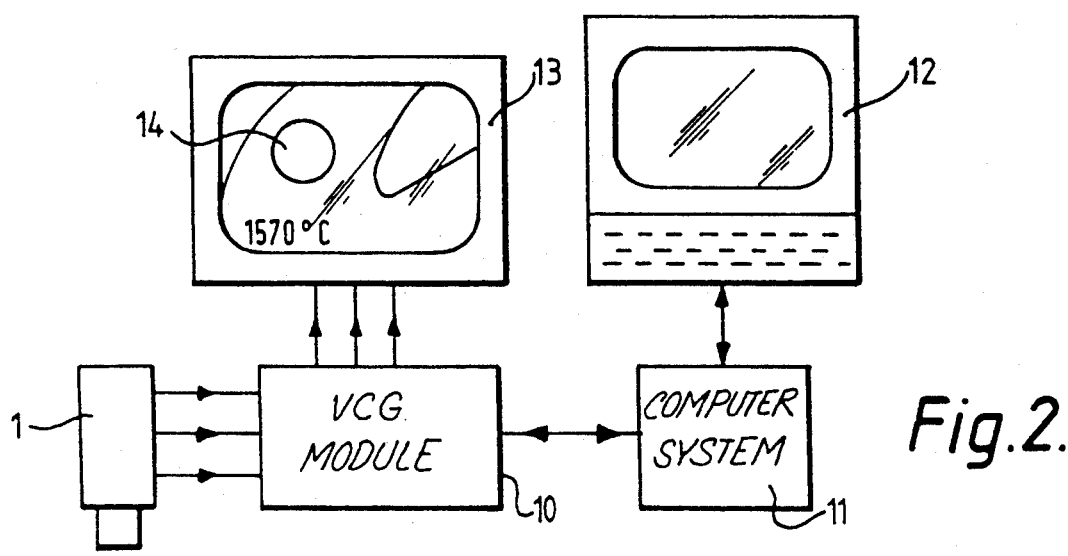
FIG. 2 is a block diagram of the apparatus used to analyse the images from the television camera.

Referring now to FIG. 2, the three electrical outputs from the camera 1 representative of the intensities of the red, green and blue images are connected to a video capture and graphics (VCG) module 10 is programmed to digitize. This VCG module 10 the electrical signals to provide three two-dimensional matrices of data values, corresponding to the red, green and blue radiation intensities from elemental areas of the camera's field of view.

The image data are transferred to a computer system 11, hosted by e.g. an IBM compatible processor 12, where the data are analysed and manipulated to perform the following functions:

(a) Detection of the "eye"

The image data relevant to the area of the "eye" 8 are identified by a series of well known edge detection data manipulations, which first enhance the overall image using digital filtering techniques, and then search for object boundaries using image processing methods, convolution operators, threshold bit mapping, "dilation" and "erosion".

(b) Calculation of steel temperature

The image data relevant to the red, green and blue radiation amplitude measurements for each picture cell (pixel), are modified by calibration constants, specific to the camera, which compensate for non-linear response to radiation intensity of the camera sensors, and divided by factors corresponding to the mean steel emissivities over the respective wavebands. The resulting red, green and blue data corresponding to each pixel are then normalised by calculating the ratio of each colour datum value to the sum of the three data values referred to as colour fractions.

Figure 3:
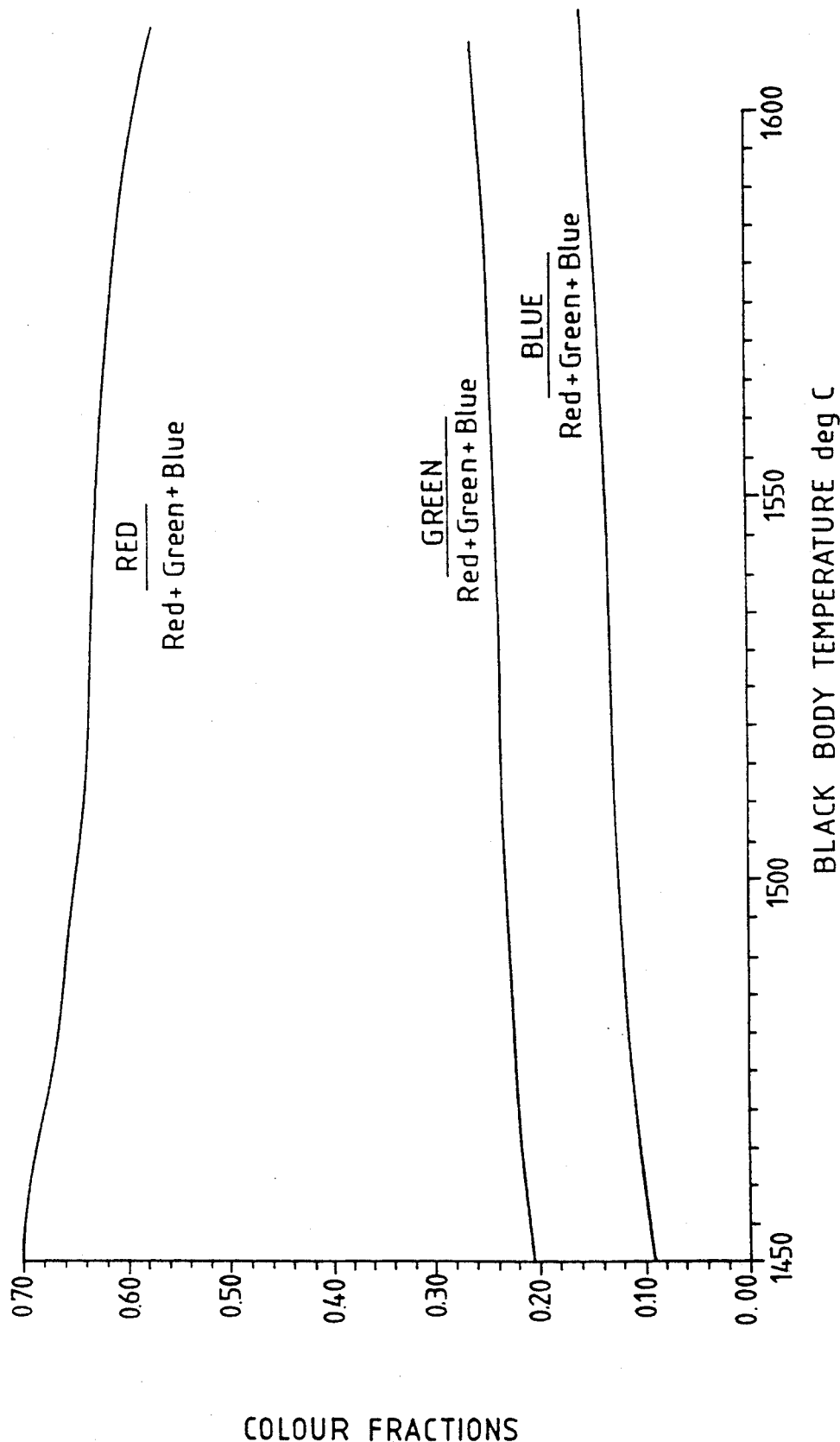
FIG. 3 illustrates how the normalised radiation intensities in the red, green and blue wavebands relate to the temperature of the steel surface in the ladle.

As shown in FIG. 3, the normalised red, green and blue data values are plotted against steel temperature. Each set of linearised and normalised data values corresponding to a colour may be related to temperature by a polynomial, typically of the third order.

Further functions of temperature, and crosschecks for data accuracy, may be generated from the acquired red, green and blue data by one or more of the following methods. In all cases it is of course possible to calibrate the algorithms by reference to data generated by viewing a molten steel source of known temperature.

(i) Two temperature values may be calculated individually from red and green data values, and the mean temperature value may be taken. The closeness of the temperature values is indicative of the confidence of the temperature measurement.

(ii) Two temperature values may be calculated individually from the ratios red/green data values and green/blue data values, and the mean temperature may be taken. The closeness of the temperature values is indicative of the confidence of the temperature measurement.

(iii) Functions of temperature including all three terms may be generated from the formula:

$$f(T) = (k1 \times r) + (k2 \times g) + (k3 \times b)$$

when r, g and b are respectively the red, green and blue data values, and k1, k2 and k3 are mapping constants for mapping r, g and b into u and v, u and v being chromaticity co-ordinates.

In particular, the mapping constants k1, k2 and k3 may be chosen to give the two functions u, and v, u being a function of temperature, and v being constant for all values of r, g, and b associated with a black body radiator. The value of u may therefore be used to calculate the temperature, and the closeness of v to its theoretical value is indicative of the confidence of the temperature measurement.

Whichever of the above methods is used, the temperature measurements may be further validated by a statistical analysis of the calculated temperatures from all the pixels corresponding to the image of the molten steel. For example, measurements may be rejected where the standard deviation of all the temperature values exceed a predetermined limit. Individual temperature measurements may also be rejected from the analysis when they lie outside the predetermined range. The precision of the mean temperature measurement is improved by use of a multiplicity of individual temperature measurements within each image "frame", and, if required, from a number of successive frames of the same area.

(c) Display of results

The digitised signals representative of the enhanced image of the ladle interior are returned to the VGC module, which converts the signals to analogue form suitable for display on a colour television monitor 13. Additional data are supplied to the VGC module 10 which enables the calculated steel temperature, e.g. 1570° C., to be displayed on this television monitor as illustrated—the "eye" is depicted as item 14 on the monitor screen.

(d) Control of Camera and VGC Module

In order to optimise precision and accuracy of the temperature measurement, the camera 1 can be directed to centre on the eye, and may be "zoomed in" on the eye, so increasing the number of elemental measurements within each image frame. The VGC module may, in addition, capture a number of frames so that the precision of the measurement may be held constant or varied as required.

It will be appreciated that the apparatus and methods described above are only exemplary of apparatus and methods for measuring temperature in accordance with the invention and that modifications can readily be made thereto without dispatching from the true scope of the invention as set out in the appended claims.

We claim:

1. Apparatus for measuring temperature of a body whose temperature is such that radiation is emitted from a surface of the body, the apparatus comprising a charge coupled camera mounted above the body whose temperature is to be measured to produce an image thereof, the camera including image receiving means comprising sensors individually sensitive to wave bands of red, green and blue radiation, means operable to produce electronic representations of the intensities of the sensed red, green and blue radiation contents of the image at a multiplicity of selected sites thereof, means for producing, from the electronic representations, data corresponding to the sensed red, green and blue radiation intensities, and means operable to compute from the data the temperature of the body.

2. Apparatus as claimed in claim 1 wherein the camera is positioned within a structure of a closure lid of a furnance containing a melt.

3. A method of measuring temperature of a body whose temperature is such that radiation is emitted from a surface of the body, the method comprising the steps of sighting onto a selected surface area of the body whose temperature is to be measured a charge coupled camera to produce an image thereof, the camera including image receiving means comprising sensors individually sensitive to wave bands of red, green or blue radiation and operable to provide electronic representations of intensities of red, green and blue radiation, determining the red, green and blue radiation intensities of the image at a multiplicity of selected sites in the image thereof to produce electronic representations thereof, and processing the electronic representations to provide a measure of the temperature of the body.

4. A method as claimed in claim 3 wherein the body comprises a melt.

5. A method as claimed in claim 4 wherein the melt is covered with a layer of molten slag and gas is injected into the melt to produce an eye on a melt surface, the eye being the selected surface area for measurement purposes.

* * * * *